United States Patent [19]

Tsuboi et al.

[11] 4,286,147
[45] Aug. 25, 1981

[54] IN-FOCUS DETECTING DEVICE

[75] Inventors: Hiroaki Tsuboi; Toshihiko Hosaka, both of Tokorozawa, Japan

[73] Assignee: Universal Pioneer Corporation, Tokyo, Japan

[21] Appl. No.: 58,647

[22] Filed: Jul. 19, 1979

[30] Foreign Application Priority Data

Jul. 19, 1978 [JP] Japan .................................. 53-88000
Jul. 19, 1978 [JP] Japan .................................. 53-88002

[51] Int. Cl.³ .............................................. G01J 1/20
[52] U.S. Cl. .................................. 250/201; 358/128.5; 369/45
[58] Field of Search ................... 250/204, 210 R, 201; 358/128; 179/100.3 V

[56] References Cited

U.S. PATENT DOCUMENTS

| 3,988,747 | 10/1976 | Lermann et al. | 250/204 X |
| 4,160,159 | 7/1979 | Kakukawa et al. | 250/204 |
| 4,160,904 | 7/1979 | Witwerding | 250/204 X |
| 4,183,640 | 1/1980 | Abe | 250/204 X |

Primary Examiner—David C. Nelms
Assistant Examiner—Darwin R. Hostetter
Attorney, Agent, or Firm—Sughrue, Rothwell, Mion, Zinn and Macpeak

[57] ABSTRACT

A focus lens protecting and in-focus detecting device has light receiving circuit and a comparator for comparing the output of said light receiving elements with a reference potential. A switch network is controlled by the output of the comparator to supply signals to a focus control amplifier from the light receiving circuit.

14 Claims, 1 Drawing Figure

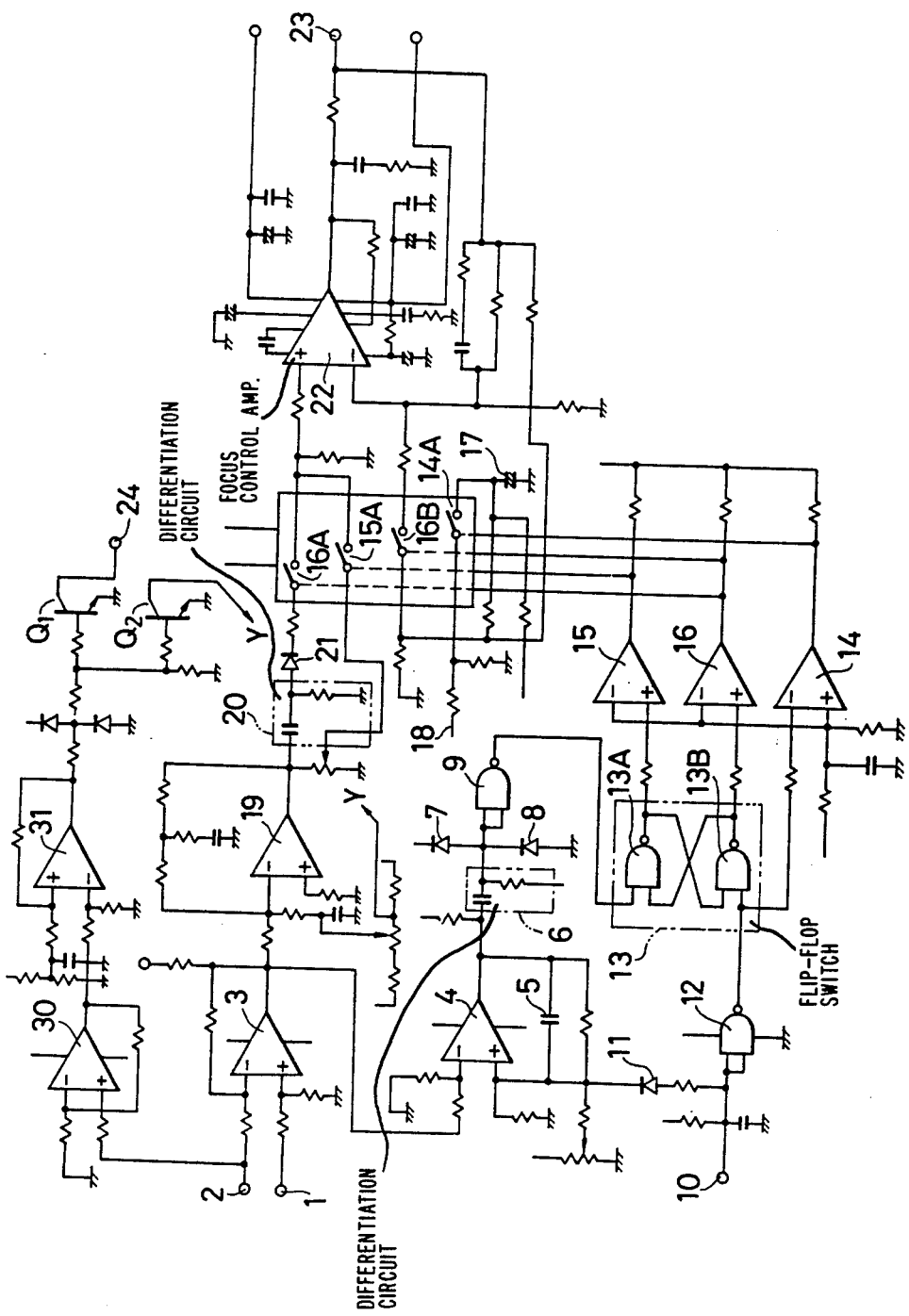

IN-FOCUS DETECTING DEVICE

BACKGROUND OF THE INVENTION

This invention relates to an in-focus detecting device which, in an optical video disk player or the like, detects whether or not a reading device is correctly positioned in the control range of a focus servo device adapted to maintain a predetermined distance between the reading device (or a focus lens) and a disk.

In a conventional device of this type, the video carrier signal recorded in the disk is read out to detect whether or not the output level of the signal thus read reaches a predetermined value. This is used to provide an in-focus signal and an out-focus signal.

However, the conventional device is disadvantageous in the following respects. In the conventional device, the output level of the video carrier signal changes with the states of the disk, light source and light receiving element. The output level is not always in correspondence to the focus condition of the reading device. Therefore, sometimes erroneous operation results where, although the reading device is out of the control range of the focus servo device, the in-focus signal is produced. Furthermore, in the case where the in-focus or out-focus signal is provided at the output terminal of the focus control amplifier, a signal from the light receiving means is delayed before reaching the focus control amplifier.

Also, when the focus servo device becomes out of order for some reason, or variation occurs beyond its control limit, the focus lens may be brought into contact with the disk. This difficulty may be overcome by providing a particular protecting device which is operated by using the output of the focus control amplifier. However, this method is disadvantageous in that signals from the light receiving elements are delayed before reaching the focus control amplifier.

SUMMARY OF THE INVENTION

Accordingly, an object of this invention is to provide an in-focus detecting device in which all of the above-described difficulties have been eliminated.

More specifically, an object of the invention is to provide an in-focus detecting device in which erroneous operations an eliminated, and signals are transmitted without delay.

It is another object of the invention to provide a device for protecting a focus lens (and accordingly, a disk) in which when the focus lens is brought extremely close to the disk, the focus lens is forcibly and quickly driven to leave the disk.

These and other objects of this invention are achieved in a focus detection and focus lens protecting device comprising: light receiving means; comparator means for comparing the output of said light receiving means with a reference potential; switch means controlled by the output of said comparator means; a focus control amplifier; and means for applying the output of said switch means to the input of said focus control amplifier.

This invention will be described herein in detail with respect to the accompanying drawing and the description of the preferred embodiment that follows.

BRIEF DESCRIPTION OF THE DRAWING

The single FIGURE in the accompanying drawing is a circuit diagram showing one example of an in-focus and lens protecting device according to the invention.

DESCRIPTION OF THE PREFERRED EMBODIMENTS

One example of an in-focus detecting device according to this invention will now be described with reference to the accompanying drawings.

Signals are produced according to the variations in configuration of a beam spot formed on, for instance, four light receiving elements and are applied to terminals 1 and 2. When correct focalization is obtained, a circular beam spot is formed on the light receiving elements. When the focus is shifted upwardly or downwardly, then a horizontally elongated elliptic beam spot or a vertically elongated elliptic beam spot is formed on the light receiving elements. Accordingly, focus servo can be effectuated by comparing the sum of the signals of two light receiving elements on one diagonal line with the sum of the signals of the remaining two light receiving elements on the other diagonal line.

In the case where the focus lens approaches a disk from above it, one (a first sum signal) of the above-described two sum signals is gradually increased to its maximum value and is then gradually decreased, while the other (a second sum signal) shifted in phase is also gradually increased. The second sum signal has the same level as that of the first sum signal when correct focalization is obtained. As the focus lens further approaches the disk, the second sum signal is increased to its maximum value and is then gradually decreased.

In the example described above, the first and second sum signals are applied to the terminals 1 and 2, respectively.

The terminals 1 and 2 are connected to the non-inversion terminal and the inversion terminal of a differential amplifier 3, respectively, the output of which is applied to the inversion terminals of an amplifier 19 and a comparator 4. The output of the amplifier 19 is applied through a diode 21 and a switch 16A or through a switch 15A to the non-inversion terminal of a focus control amplifier 22. The inversion terminal of amplifier 22 is connected through switches 16B and 14A to a negative constant potential line 18. One terminal of the switch 14A is grounded through a capacitor 17.

The comparator 4 has a hysteresis characteristic based on a positive feedback route including a capacitor 5. The output of the comparator 4 is applied through a differentiation circuit 6, diodes 7 and 8 and an inverter 9 to one input terminal of a NAND circuit 13A in a flip-flop switch 13. The output of the NAND circuit 13A is applied to the non-inversion terminal of an amplifier 15 and to one input terminal of another NAND circuit 13B in the flip-flop switch 13.

A signal from a terminal 10 is applied through an inverter 12 to the other input terminal of the NAND circuit 13B and the inversion terminal of an amplifier 14. The terminal 10 is connected through a diode 11 to the non-inversion terminal of the comparator 4. The output of the amplifiers 14, 15 and 16 are connected to the switches 14A, 15A and 16A and 16B to control the on-off operations thereof, respectively.

The terminal 2 is connected through the non-inversion terminal of an amplifier 30 and the output thereof applied to the inversion terminal of a comparator 31.

The comparator 31 output is applied to the bases of transistors Q₁ and Q₂. The collector Y of the transistor Q₂ is connected to a terminal Y connected to the inversion terminal of the amplifier 19.

Now the operation of the circuit thus organized will be described. When the power switch is turned on, a logic high level signal (hereinafter referred to merely as "an H signal" when applicable) is applied through the terminal 10 to the inverter 12. As a result of which the inverter 12 outputs a logic low level signal (hereinafter referred to merely as "an L signal" when applicable). Since this L signal is applied to the inversion terminal of the amplifier 14, the amplifier 14 output and H signal are used to turn on the switch 14A.

On the other hand, since the NAND circuit 13B outputs an H signal, the amplifier 16 provides an H signal to turn on the switches 16A and 16B. In this case, the differential amplifier 3 provides no output yet, and the output of the comparator 4 is an H signal. However, because the differentiation circuit 6 is interposed between the comparator 4 and the inverter 9, an L signal is inputted to the inverter 9, and therefore the inverter 9 outputs an H signal. Accordingly, H signals are applied to both inputs of the NAND circuit 13A, and therefore an L signal is outputted by the NAND circuit 13A.

Thus, the amplifier 15 outputs an L signal to turn off the switch 15A. When the H signal is applied to the terminal 10, it is also applied to the comparator 4. That is, the reference voltage of the comparator 4 is increased. Accordingly, there is no possibility that when a noise signal is applied to the inversion terminal of the comparator 4, the latter 4 will be erroneously operated. Line 18 in the center of the FIGURE is connected to a predetermined negative potential. Therefore, the negative potential is applied through the switches 14A and 16B to the inversion terminal of the focus control amplifier 22. As a result, a positive potential DC voltage is outputted by the amplifier 22. As a result, the focus lens connected to a terminal 23 is moved away from the disk.

In the case where the disk is moved to position below the focus lens and a signal is provided to permit the focus lens to approach (move downwardly) the disk, an L signal is supplied to the terminal 10. This signal is applied through the inverter 12 to the amplifier 14. As a result, the amplifier 14 outputs an L signal to turn off the switch 14A and the capacitor 17 which has been charged is discharged. Accordingly, the discharge potential is applied through the switch 16B to the focus control amplifier 22 to drive it. Therefore, the focus lens is gradually moved downwardly to the disk.

The first and second sum signals are applied to the non-inversion terminal and the inversion terminal of the differential amplifier 3 as described before. Therefore, as the focus lens is moved downwardly to the disk, the positive potential at the output of the differential amplifier 3 is gradually increased to the maximum value and is then decreased. The potential becomes zero when focalization is obtained. When the focus lens is moved further downward, the second sum signal level becomes greater than the first sum signal level. Therefore, a negative potential is provided at the output of the differential amplifier 3, and the negative potential is gradually increased in the negative direction to its maximum value and is then decreased.

When the focus lens is moved further downward to the disk, the negative potential becomes zero. If the downward movement of the focus lens is continued, the focus lens may be brought into contact with the disk. That is, a signal having a so-called "S" curve characteristic is provided at the output of the differential amplifier 3.

As the focus lens is moved downwardly to the disk from its upper position, the positive potential is provided at the output of the differential amplifier 3 and it is gradually increased. This output is amplified by the amplifier 19, and the positive AC component is applied through the differentiation circuit 20, the diode 21 and the switch 16A to the focus control amplifier 22. Accordingly, the focus lens is moved downwardly (toward the disk) while being slightly driven upwardly (away from the disk). This opposite driving force facilitates to the focus servo of the focus lens.

On the other hand, the output of the differential amplifier 3 is also applied to the comparator 4. Therefore, when a voltage higher than the reference voltage is applied to the comparator 4, the comparator outputs the L signal instead of the H signal. This change is subjected to differentiation in the differentiation circuit 6. However, because the diode 8 is turned on, the L signal is substantially maintained, as is, at the input of the inverter 9. However, if the focus lens is further moved downwardly, then the input of the comparator 4 is gradually decreased through the external value, and reaches a predetermined value lower than the value obtained when the output of the comparator 4 is changed from the H signal to the L signal (the comparator 4 having the hysteresis characteristic). In this case, the output of the comparator 4 is changed from the L signal to the H signal. This change is subjected to differentiation in the differentiation circuit 6 and is then applied to the inverter 9.

As a result, that L signal is outputted by the inverter 9. Accordingly, the state of the flip-flop switch formed with the NAND circuits 13A and 13B is changed. That is, the NAND circuits 13A and 13B output the H signal and the L signal, respectively. As a result, the switch 15A is turned on with the aid of the amplifier 15, while the switches 16A and 16B are turned off with the aid of the amplifier 16. Hence, the output of the amplifier 19 is applied, as is, through the switch 15A to the amplifier 22 to start the focus servo of the focus lens.

Because the comparator 4 has the hysteresis characteristic, the focus servo is started immediately before the focalization is obtained (at a position where the focus lens is slightly away from the standard position). Accordingly, if the focus lens is moved to the disk from the standard position, then the H signal (to move the focus lens upwardly) is applied to the terminal 23. If the focus lens is moved away from the standard position, then the L signal (to move the focus lens downwardly) is supplied to the terminal 23. Thus, the focus lens is vibrated up and down with the standard position as the vibration center.

As the reading lens is moved downwardly to the standard position, the first sum signal is decreased while the second sum signal is increased. The second sum signal is amplified by the amplifier 30 and is then compared with a predetermined reference voltage in the comparator 31. When the second sum signal is greater than the reference voltage the output of the comparator 31 is changed from the H signal to the L signal. The transistor Q₁ is rendered non-conductive (off) and the output at the terminal 24 is changed from the L signal (or an out-focus signal) to the H signal (or an in-focus signal). Thus, a focus signal representative of the distance between the focus lens and the disk can be obtained at the terminal 24.

It is preferable that the reference voltage of the comparator 31 be suitably selected so that the timing the output of the comparator 4 is changed from the L signal to the H signal coincides with the time the output of the comparator 31 is changed from the H signal to the L signal. The focus signal is supplied to, for instance, a microcomputer (not shown), so that it can be utilized as a signal to start the subsequent operation of video disk play or the like.

The transistors $Q_1$ and $Q_2$ are simultaneously rendered either conductive or non-conductive. The collector Y of the transistor $Q_2$ is connected to the terminal Y connected to the inversion terminal of the amplifier 19 as described before. Therefore, when the out-focus state occurs (or the transistor $Q_2$ is rendered conductive), then the potential at the inversion terminal of the amplifier 19 is increased in the negative direction. Therefore, the outputs of the amplifier 19 and the focus control amplifier 22 are increased in the positive direction, and the focus lens is moved upwardly to leave the disk. Thus, if the focus lens is moved extremely close to the disk, then the focus lens is forcibly driven upwardly. Accordingly, the focus lens will never be brought into contact with the disk.

As is apparent from the above description, according to the invention, the signal representative of the focus condition is detected directly at the output terminal of the light receiving means, and the signal is not significantly delayed. Furthermore, instead of the fact that the particular signal included in the output of the light receiving means is detected to obtain its level, the level of the output itself of the light receiving means is detected, and therefore the focus signal corresponding to the actual position of the reading device can be obtained. Accordingly, the in-focus detecting device according to the invention is not affected by the variations in condition of the disk, light source and light receiving means.

It is also apparent from the above description that according to the invention, even if the output of the focus control amplifier to drive the focus lens upwardly is decreased because the focus lens approaches the disk beyond the control limit of the focus servo device, the focus lens is forcibly driven to move apart from the disk. Therefore, the focus lens will never be brought into contact with the disk. Furthermore, according to the invention, the focus lens protecting operation is quickly achieved when compared with the case where the protecting device is operated by the utilization of the output of the focus control amplifier.

What is claimed is:

1. An in-foucs detecting device for a lens of an optical video disk player comprising; light quantity detecting means, comparator means for comparing the output of said light quantity detecting means with a reference voltage; switch means controlled by the output of said comparator means, and means for preventing said lens from contacting a disk being played on said video disk player.

2. A focus lens protecting device for use in an optical video disk player comprising: light quantity detecting means; comparator means for comparing the output of said light quantity detecting means with a reference potential; switch means controlled by the output of said comparator means; a focus control amplifier operable to drive said lens toward or away from a disk being played on said video disk player; and means receiving the output of said switch means for applying the output of said light quantity detecting means to the input of said focus control amplifier.

3. The device of claims 1 or 2 wherein said light receiving means comprises a first amplifier quantity detecting first and second sum signals indicative of lens position and a second amplifier receiving said second sum signal.

4. The device of claim 3 wherein said second sum signal is applied to the inversion terminal of said first amplifier and the non-inversion terminal of said second amplifier.

5. The device of claim 3 wherein said comparator means comprises a first comparator receiving the output of said first amplifier and a second comparator receiving the output of said second amplifier.

6. The device of claim 5 further comprises a pair of transistors coupled to said second comparator and a first output terminal from one transistor providing a signal indicative of the distance between said lens and a focusing surface.

7. The device of claim 3 further comprising a third amplifier receiving the output of said first amplifier at an inversion terminal thereof.

8. The device of claim 7 further comprising differentiation means coupled between said third amplifier and said switch means.

9. The device of claims 1 or 2 further comprising differentiation means coupled between said comparator means and said switch means.

10. The device of claim 1 or 2 wherein said switch means comprises a NAND circuit flip-flop switch and amplifier means receiving the output of said flip-flop switch.

11. The device of claim 10 wherein said NAND circuit flip-flop switch receives a first logic signal from said comparator means and a second logic signal from an input terminal.

12. The device of claim 11 further comprising a differentiation circuit and an inverter coupling said comparator means to said NAND circuit flip-flop switch for supplying said first logic signal.

13. The device of claim 2 wherein said means for applying the output of said light quantity detecting means comprises an array of switch elements having gates controlled by said switch means, said switch elements interposed between said light quantity detecting means and said focus control amplifier.

14. The device of claim 13 further comprising amplifier means receiving the output of said light receiving means, and a differentiation circuit coupling said amplifier means to said array of switching elements.

* * * * *